April 20, 1926.
W. H. MOUNT
1,581,518
SHIPPING AND DISPLAY BOX
Filed Oct. 10, 1922    5 Sheets-Sheet 3
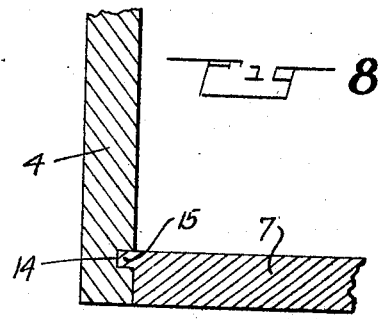
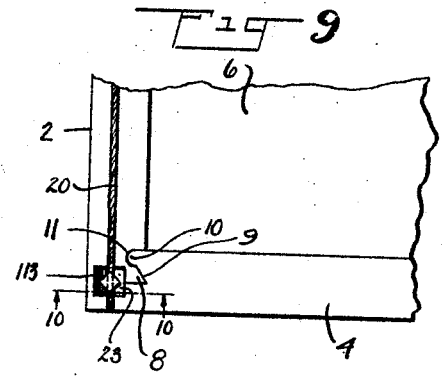
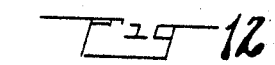
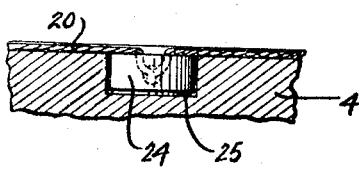
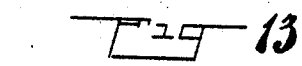
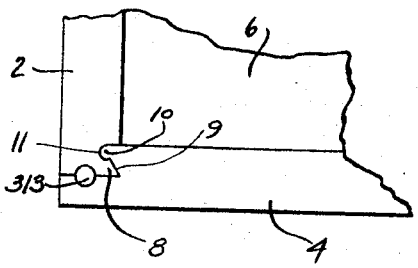

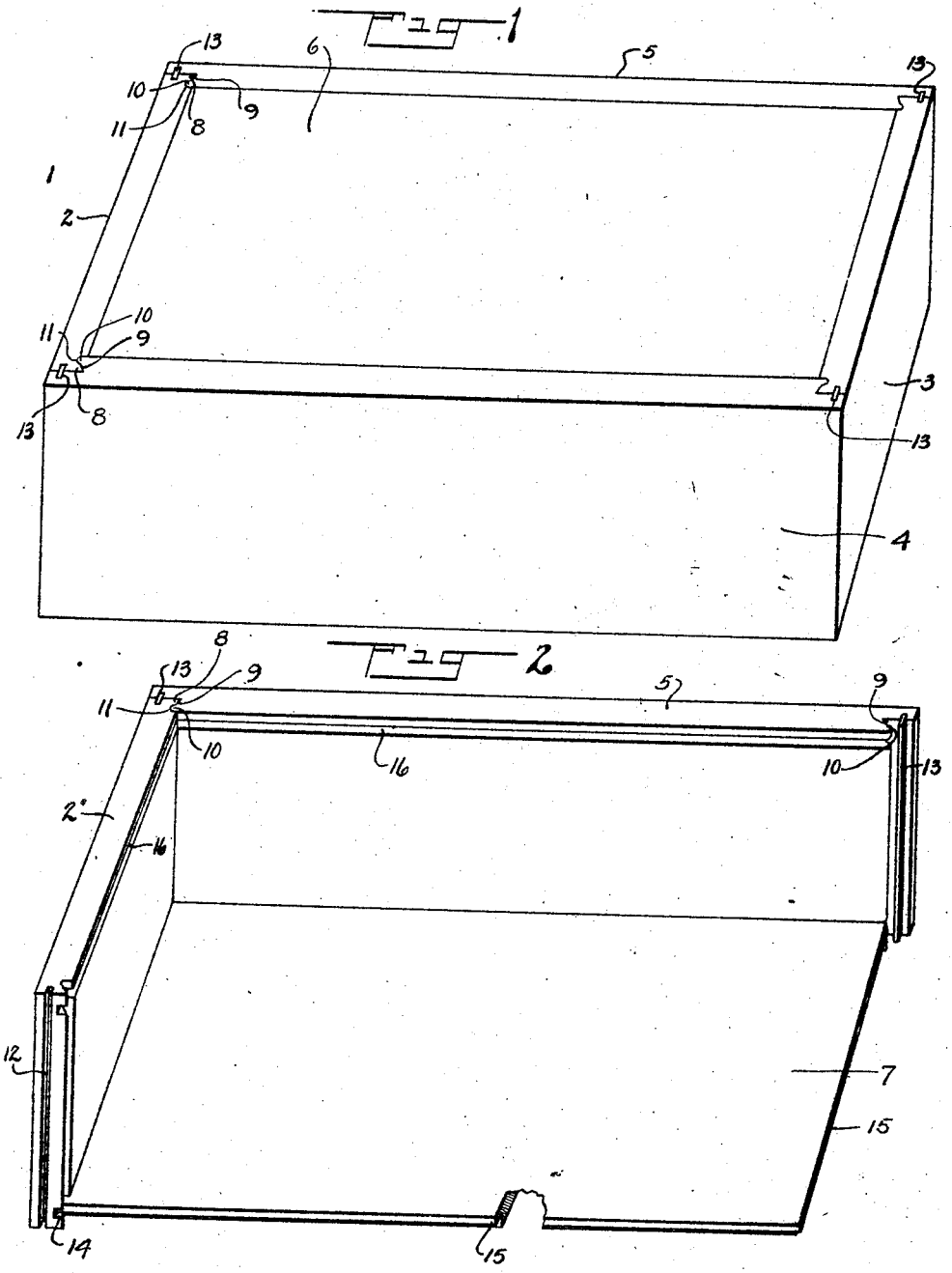

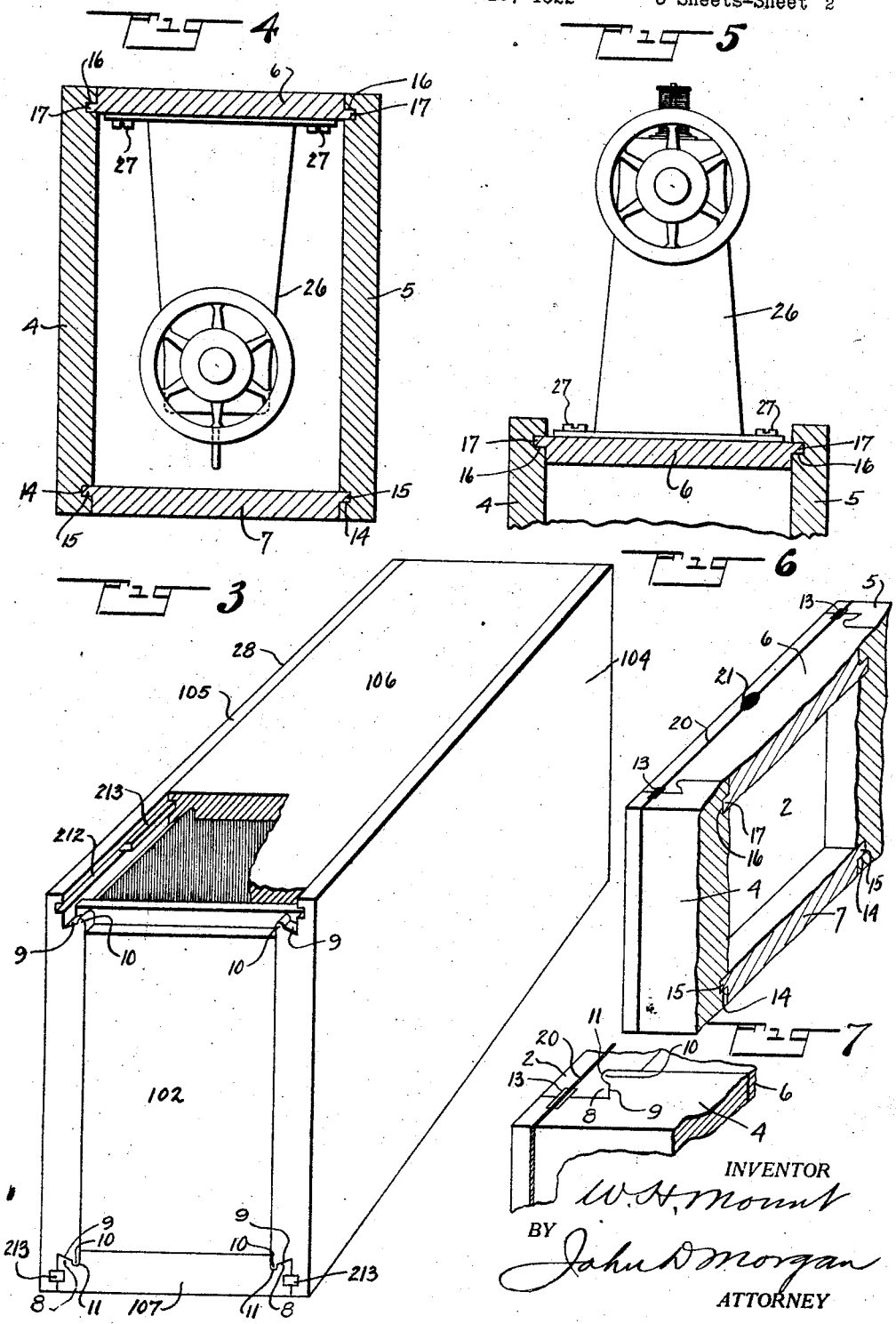

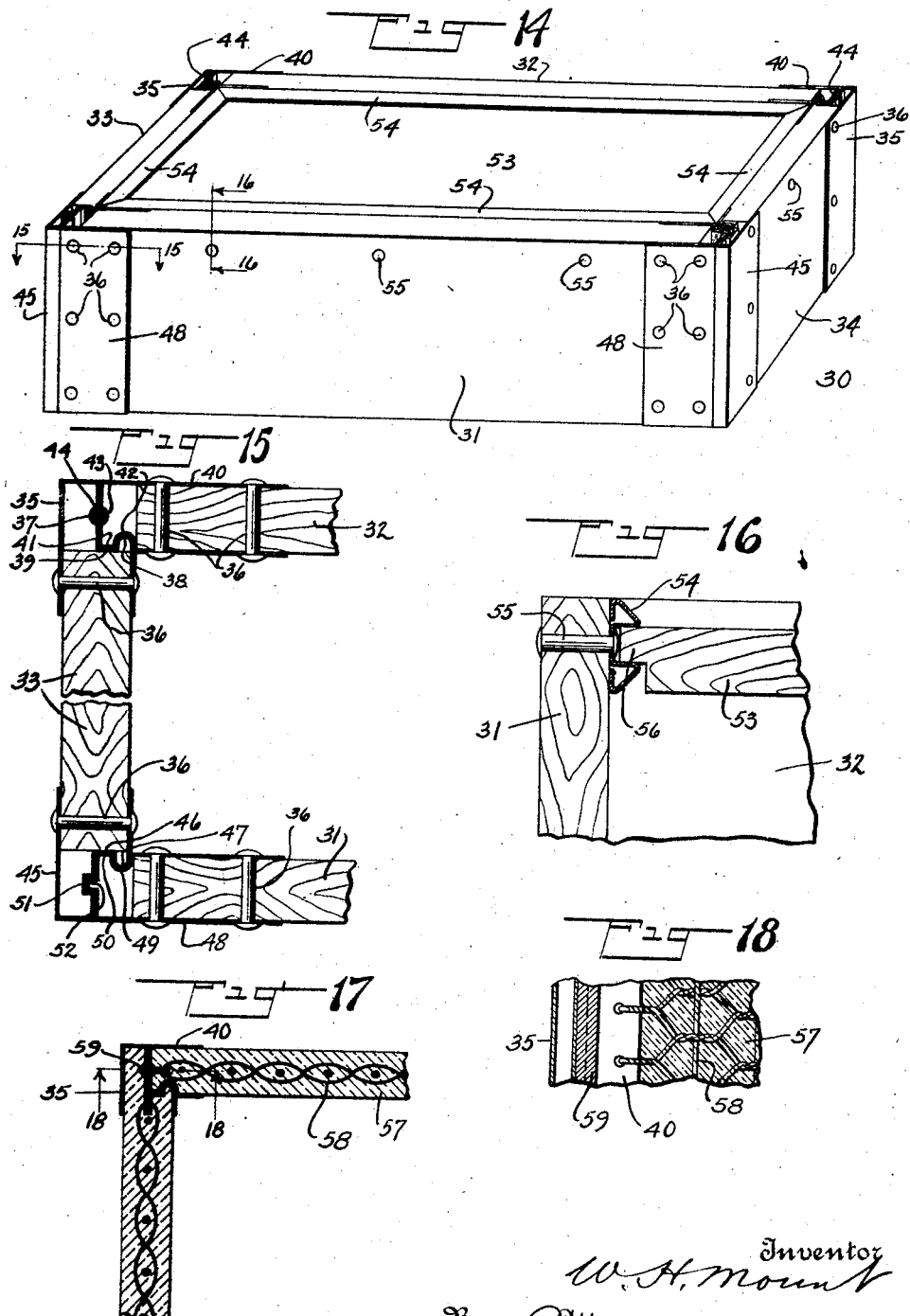

April 20, 1926.
W. H. MOUNT
SHIPPING AND DISPLAY BOX
Filed Oct. 10, 1922
1,581,518
5 Sheets-Sheet 5
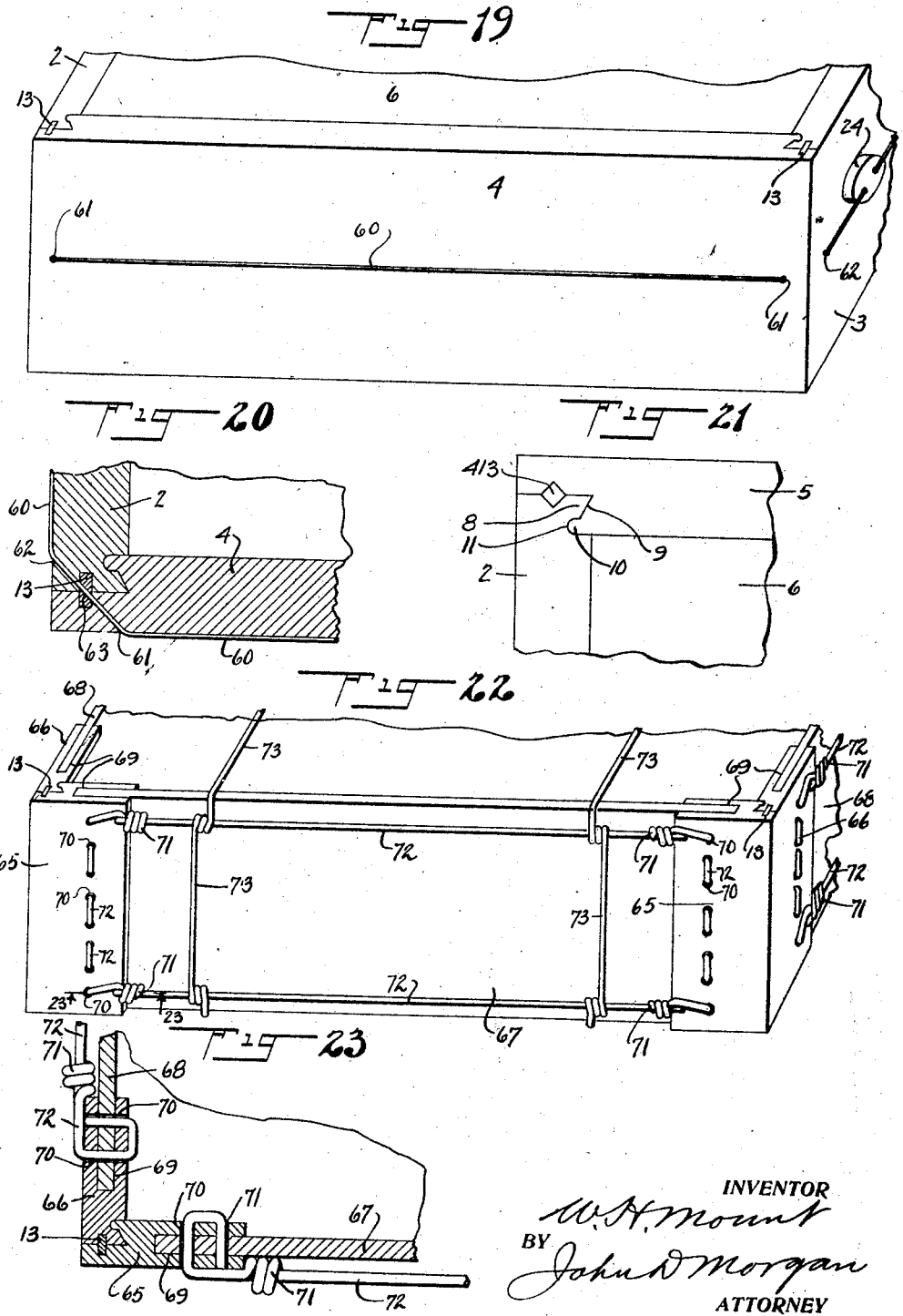

Patented Apr. 20, 1926.

1,581,518

UNITED STATES PATENT OFFICE.

WILLIAM H. MOUNT, OF SUMMIT, NEW JERSEY.

SHIPPING AND DISPLAY BOX.

Application filed October 10, 1922. Serial No. 593,593.

*To all whom it may concern:*

Be it known that I, WILLIAM H. MOUNT, a citizen of the United States, residing at Summit, in the county of Union and State of New Jersey, have invented certain new and useful Improvements in Shipping and Display Boxes, of which the following is a specification.

The invention relates to a novel, simple and economical shipping and display box and the like, which can be shipped in a knocked down state and assembled by the user with unskilled labor. The box can be used time and again and can be made into a display cabinet if desired.

The invention can also be used with drawers, trays and furniture construction generally.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate several embodiments of the invention, but to which my invention is not to be confined, and together with the description, serve to explain the principles of the invention.

Of the drawings:—

Fig. 1 is a perspective view of the simplest form of my invention;

Fig. 2 is a perspective view of the same box shown in Fig. 1 but with one side, one end and the cover removed;

Fig. 3 is a perspective view of another form of box with the cover partly broken away for purposes of illustration;

Fig. 4 is a vertical section of my box with an article to be displayed secured to the cover;

Fig. 5 is a vertical fragmentary view similar to Fig. 4 but with the cover reversed to display the article normally carried in the box;

Fig. 6 is a perspective and sectional view showing one means of sealing the box;

Fig. 7 is a perspective detail view of the same box shown in Fig. 6, but on a larger scale;

Fig. 8 is a detail sectional view;

Fig. 9 is a detail fragmentary plan view of a modified form showing a different way of sealing the box;

Fig. 10 is a vertical section substantially on the line 10—10 of Fig. 9;

Fig. 11 is a fragmentary plan view of still another modified form of sealing the box;

Fig. 12 is a vertical section substantially on the line 12—12 of Fig. 11;

Fig. 13 is a fragmentary plan view showing a key peg of different contour;

Fig. 14 is a perspective view of still another modification in which the box is provided with interlocking metal engaging surfaces;

Fig. 15 is a horizontal section, on an enlarged scale, substantially on the line 15—15 of Fig. 14;

Fig. 16 is a vertical section substantially on the line 16—16 of Fig. 14, showing the manner of attaching the metal groove;

Fig. 17 is a horizontal section of a further modification in which the sides and ends of the box are formed of reenforced material having metal engaging surfaces;

Fig. 18 is a horizontal section on the line 18—18 of Fig. 17;

Fig. 19 is a perspective view of my shipping and display box equipped with the preferred form of sealing device;

Fig. 20 is a detail fragmentary horizontal section of Fig. 19;

Fig. 21 is a detail perspective view showing a square key plug;

Fig. 22 is a fragmentary, perspective view of another modification of my invention;

Fig. 23 is a detail, horizontal section on line 23—23 of Fig. 22.

My invention relates to shipping and display boxes and the like and more particularly to one which can be manufactured by the simpliest machines and at small cost. It further relates to such a box which can be knocked down to take up the minimum space.

Besides the low cost of manufacture, the box has many other advantages among which are the following:

It can be assembled by the user with the aid of unskilled labor; no nails, screws, or other similar fastenings are employed; it can be used over and over again and stored in a knocked down condition when not in use; it will not only protect the article shipped in the box, but it can serve as a display cabinet to display the article, which is normally packed within it, or as a stand for said article; when a sealing device is employed, a glance at the box will show whether or not its contents have been tampered with; there is an appreciable saving in material in the length of its sides and ends as compared with ordinary box construction of the same capacity; if the box is to be stained and varnished this can be done before the box is assembled, by dipping, which is the cheapest form of finishing; there are no nail holes to putty when staining and varnishing; there is no gluing or clamping of the box, the box is as strong as one formed by nailing, without the disadvantage of having to break or mar the box to unpack it; by making the sides and ends of boards of different widths, a box can be built of any height and still use the same bottom and cover which permits less stock to be carried. When the invention is used with drawers, trays and furniture construction generally, a strong and economical construction is obtained. Other advantages will be clear from the following description.

In my box the sides, ends, top and bottom all have cooperating engaging surfaces which serve to hold the different members of the box together without the aid of nails or screws or similar fastening means.

I have shown in Figs. 1 and 2, a knockdown shipping and display box 1, having the removable ends 2 and 3 and removable sides 4 and 5. The box is also provided with a removable cover 6 and a removable bottom 7, shown in Fig. 2. The ends 2 and 3 are provided with tongues 8, 8 which fit into cooperating grooves 9, 9 in the sides 4 and 5. The sides 4 and 5 are also provided with interlocking tongues 10, 10, which fit into cooperating grooves 11, 11 in the ends 2 and 3, so that each of the ends and sides have both a tongue and a groove.

I also provide grooves 12 partly in the ends and partly in the sides for the reception of the key pegs 13, 13, one peg being in each corner of the box shown by way of example in Figs. 1 and 2. The sides 4 and 5, and the ends 2 and 3 are provided with horizontal grooves 14, 14 for the reception of the tongue 15 mounted on the bottom 7, see Fig. 8. This tongue 15 extends out on all four sides of the bottom 7. The sides 4 and 5 and ends 2 and 3 are also provided with a similar groove 16 within which fits the tongue 17 of the cover 6.

In assembling the box, the sides 4 and 5 are brought into cooperative relation with the tongue 15 of the bottom 7 so that this tongue will be located within the groove 14 in the sides 4 and 5. One of the ends, preferably 2, is then brought into cooperative relation so that its tongues and grooves cooperate with the complementary tongues and grooves on the sides 4 and 5. Two key pegs 13, 13 are then slipped into the grooves 12, 12 formed partly in the end 2 and sides 4 and 5. The cover 6 is then brought into cooperative position so that its tongues 17, 17 will slide in the grooves 16, 16 of the sides 4 and 5; that portion of the tongue 17 on the end of the cover 6 is received in the portion of the groove 16 located in the end 2. The end 3 is then brought up into cooperative relation with the sides 4 and 5, and the cover 6 and bottom 7, which will then close the box. To secure it in this position two more key pegs 13, 13 are dropped or forced into the grooves 12, 12 formed partly in the sides 4 and 5 and in the end 3. The box is then ready to be shipped without any nailing or other metal fastener being employed.

The consignee can readily unpack the box, without defacing it and with a minimum amount of trouble, by simply pressing with a blunt tool upon for example, the two key pegs 13, 13 shown on the right of Fig. 1, which will permit the end 3 to be removed from the other parts of the box. The cover 6 can then be pulled out so that the contents of the box are exposed. By removing the other two key pegs 13, 13 the entire box can be knocked down and stored away in a minimum space until such time as it may be desired to again use it, when it can be assembled in the manner previously described at length. As it is not necessary to deface the box to open it, it can be used over and over again.

In some cases I may use a seal in connection with the box so as to show at a glance whether or not the contents of the box has been tampered with during shipment. Any suitable form of sealing means may be employed. I have shown, for example, in Figs. 6, 7, 9, 10, 11, 12, 19 and 20, different forms of seals, which may be employed. It is to be understood, of course, that my invention is not limited to these particular seals.

In Fig. 7, I have shown the box sealed with a sealing wire 20 which passes entirely around the box and over the key pegs 13, 13, the ends of the sealing wire 20 being secured by a lead seal 21 upon which can be impressed any emblem or insignia. It will be impossible to reach the contents of the box without removing at least two of the key pegs 13, 13. They cannot, however, be removed without breaking the sealing wire 20 or seal 21, which will immediately and at a glance inform the consignee that the contents have been tampered with. When such a sealing wire 20 is used it also performs the function of an ordinary box strap and strengthens the box.

Any other form of sealing means may be used. I have shown in Figs. 9 and 10 a sealing wire 20 passing through the key peg 113, which is the same in all respects as the key peg 13, except that it is square and provided with an eye through which passes the sealing wire 20. In this form I may provide the box with recesses 23 for the reception of any sealing medium to prevent the removal of the sealing wire 20 from the eye in the key peg 113 without leaving evidence that the seal has been tampered with.

In Figs. 11 and 12, I have shown another form of seal in which the sealing wire 20 passes over the key pegs 13, the ends of the wire being secured in a well-known form of seal 24 mounted in a recess 25 in the side 4 of the box. I make no claim to the particular form of seal 24, as it is well known in the trade and illustrate it to show that any suitable form of seal may be employed.

I have shown the preferred form of sealing device in Figs. 19 and 20. In this form the sealing wire 60 passes through openings 61 in the sides 4 and 5 (not shown) and through openings 62 on the ends 2 and 3 of the box. The sealing wire, cord or member 60 also passes through a hole 63 in the key pegs 13, 13, see Fig. 20. The ends of the sealing wire 60 are secured in the well-known form of seal 24.

The contents of the box cannot be removed without breaking the seal 24 or the sealing wire or member 60 to release the key pegs 13, 13. This permits the consignee to see at a glance if the contents have been tampered with.

My box may be also used as a display cabinet or stand. I have shown in Figs. 4 and 5 a box, in all respects similar to Figs. 1 and 2, except that the sides 4 and 5 are wider than those in Fig. 1, which makes the box deeper. In this form the article 26, which is normally carried within the box and which I have shown by way of illustration as a sewing machine, though it may be any object, is secured to the under surface of the cover 6 by means of the screws 27, 27. To display or use the sewing machine, it is merely necessary to slide out the cover 6, after removing either the end 2 or 3 as previously described, and reverse the cover as shown in Fig. 5, when the article 26 can be either displayed or used. By reversing the cover, the article can be again stored within the box ready for shipment.

Instead of having the key pegs 13 mounted vertically within the box, I may mount them horizontally as shown in Fig. 3. In this figure, the box 28 is the same in all respects as the box previously described, having the sides 104, 105, ends 102 and 103 (not shown) cover 106 and bottom 107, except that the key pegs 213 are mounted in horizontal grooves 212 formed partly in the sides 104 and 105. These key pegs 213 operate in the same manner as the key pegs 13 except that they are placed in the box horizontally instead of vertically.

In Fig. 13, I have shown a modification in which I may use round key pegs 313, which are the same in all respects as the key pegs 13, except of different configuration.

In Fig. 21, I use square key pegs 413 which present surfaces at 45° to the meeting surfaces of the sides and ends of the box.

In the shipping and display boxes so far described the cooperating, locking and engaging surfaces are formed by cutting the grooves and tongues out of the material of which the box is made by well-known wood working machines. In some cases, however, I may provide the box with separate metal cooperating engaging surfaces which are secured to the sides and ends of the box in any suitable manner, such as by riveting. I have shown such modifications of my invention in Figs. 14 to 18.

In Figs. 14 to 16, I have provided a box 30 with wooden sides 31, 32 and wooden ends 33 and 34. At each end of these sides and ends, I secure a metal cooperating locking surface adapted to cooperate with a similar locking surface carried by the other portion of the box. I have shown for example the end 33, having at one end a metal locking surface 35, which is secured to the end 33 by the rivets 36. This metal member is provided with a groove 37 and with a metal tongue 38 and a metal groove 39. The side of the box 32 is provided with a complementary metal member 40 secured to it by the rivets 36 and is provided with a metal tongue 41 and a metal groove 42 to cooperate with the metal tongue and grooves 39 and 38, carried by the end 33. This member is also provided with a metal groove 43, which with the metal groove 37, forms a circular seat for the round key peg 44.

I have shown a different form of metal engaging surfaces at the lower portion of Fig. 15. In this form the metal member 45 is secured to the end 33 by the rivets 36 and is provided with a metallic groove 46 and a metallic tongue 47. The side 31 of the box is provided with a metal member 48 having a complementary metal groove 49 and metal tongue 50 to cooperate with the metal tongue and groove 46 and 47 on the end 33. In this form, however, I do not use a separate key peg. Instead, I provide the metallic locking member 45 with a groove 51 and provide the metal member 48 with the metallic tongue 52 to cooperate with the groove 51, as shown at the bottom of Fig. 15 and in Fig. 14. The box, shown in Fig. 14, is provided with two key pegs 44, 44 the other two corners having the locking members shown at the bottom of Fig. 15. The key pegs of Figs. 14 and 15 may be sealed in place by any of the sealing means shown in Figs. 6, 9, 11, 19 or 20.

The cover 53 as well as the bottom (not shown) is held to the sides and ends of the box 30 by securing a metal channel 54 by means of rivets 55, or other securing members, so that this channel extends entirely along the sides 31, 32 and the ends 33 and 34. The cover 53 is provided with a tongue 56 that slides in that portion of the channel 54 secured to the sides 31 and 32, and fits into that portion of the channel 54 secured to the ends 33 and 34, when the box is closed as shown in Fig. 14. The bottom (not shown) is secured by similar channels 54.

I have shown another modification of my invention in Figs. 17 and 18, in which the box is formed of reenforced material, as for example, by reenforcing the material 57 by means of woven wire 58. In this construction, metallic cooperating engaging surfaces are shown the same as in the upper portion of Fig. 15, except that a square key peg 59 is used instead of the round key peg 44 shown in that figure.

In Figs. 22 and 23, I have shown another modification of my invention in which I employ metal or other strong side members 65, cooperating with metal or other strong end members 66, 66, these members having co-operating engaging surfaces and key pegs 13, 13 as shown in the other forms of my invention. Sealing means for the key pegs as in Figs. 6, 9, 11, 19 or 20 may be used with the form of the invention shown in Figs. 22 and 23.

To these strong side members 65, 65 are secured the sides 67, 67 (only one being shown) of much weaker material. To the end members 66, 66 are likewise secured relatively weaker ends 68, 68. Therefore in this form of my invention each side and each end will consist of two strong interlocking members and interposed weaker members. In practice I preferably form the side members 65, 65 and the end members 66, 66 of metal and the weaker interposed members 67 and 68 of thin wood. These members may be secured together in different ways. I have shown, for example, the side members 65, 65 and the end members 66, 66 provided with grooves 69, 69 within which the weaker sides 67, 67 and weaker ends 68, 68 may be secured in any suitable manner.

Preferably I secure the weaker sides 67 and ends 68 to their respective strong side members 65 and end members 66 by providing registering holes 70, 70 in said members 67 and 65 and 68 and 66, Fig. 23, and pass the end 71 of a wire 72 through said holes or openings 70, 70, wrapping the ends 71, 71 around the wires 72, 72, as shown in Fig. 23 and also in Fig. 22.

I may also use one or more binding wires 73, 73 extending around the box and engaging with the wires 72, 72, preferably by being wound around said wires 72, 72.

The invention in its broader aspects is not limited to the specific boxes or similar members shown and described, but departures may be made therefrom within the scope of the accompanying claims without departing from the principles of the invention and without sacrificing its chief advantages.

What I claim is:—

1. A new article of manufacture comprising a knock down shipping and display box having top, bottom, sides and ends provided with interlocking engaging surfaces, the top being adapted to slide on the sides when one end is removed, and locked in position when the end is secured in its own proper position and key pegs to removably lock the parts together.

2. The combination in a knock down shipping and display box of removable top, bottom, sides and ends having cooperating engaging surfaces, key pegs, to removably lock said surfaces, and sealing means cooperating with said pegs.

3. The combination in a knock down shipping and display box of removable top, bottom, sides and ends, the sides and ends having metal interlocking surfaces, and key pegs to hold said metal interlocking surfaces together.

4. The combination in a knock down shipping and display box formed of reenforced material, the sides and ends having metal interlocking surfaces, and key pegs to hold said metal interlocking surfaces together.

5. The combination in a knock down shipping and display box of removable top, bottom, sides and ends having cooperating engaging surfaces, one of the removable ends serving to close the box and hold the cover in position, and key pegs to hold the removable end in position.

6. The combination in a knock down shipping and display box of removable top, bottom, sides and ends having cooperating engaging surfaces, one of the removable ends serving to close the box and hold the cover in position, and a removable key peg and integral metal interlocking members to hold the removable end in position.

7. A new article of manufacture comprising a knock down shipping and display box having a removable top, bottom, sides and ends removably secured together, key pegs, and locking means engaging with said key pegs to give visible evidence if the contents of the box has been tampered with.

8. A new article of manufacture comprising a knock down shipping and display box having a removable top, bottom, sides and ends removably secured together, key pegs, and locking means engaging with said key pegs and passing around the corners of the box to give visible evidence if the contents of the box has been tampered with.

9. A new article of manufacture comprising a knock down shipping and display box having a removable top, bottom, sides and ends removably secured together, key pegs, and a locking or sealing wire or member engaging with the key pegs and passing around the corners of the box and a seal securing the ends of said wire or member to give visible evidence if the contents of the box has been tampered with.

10. A box comprising in combination side and end members formed to interengage with one another, and also provided with slots adapted to register to form a slot for a key peg, a key peg, and sealing means for indicating the removal of a key peg.

11. A box comprising in combination side and end members formed to interengage with one another, and also provided with slots adapted to register to form a slot for a key peg, a key peg, and sealing means passing around the box for indicating the removal of a key peg.

12. A box comprising in combination side and end members formed to interengage with one another, and also provided with slots adapted to register to form a slot for a key peg, a key peg, and sealing means passing around the box and directly engageable with a plurality of key pegs, for securing each of them in locking position.

13. A box comprising side and end members each provided with a tongue and a groove adapted to interlock to form a corner of the box, and each also provided with a slot, which slots are adapted to register to form a slot for a key peg, a key peg, and sealing means for sealing the key peg in locking position.

14. A box comprising side and end members each provided with a tongue and a groove adapted to interlock to form a corner of the box, and each also provided with a slot, which slots are adapted to register to form a slot for a key peg, a key peg, and sealing means passing around the box for sealing the key peg in locking position.

15. A box comprising side and end members each provided with a tongue and groove adapted to interlock to form a corner of the box, and each also provided with a slot, which slots are adapted to register to form a slot for a key peg, a key peg, and sealing means passing around the box for sealing a plurality of key pegs in locking position.

In testimony whereof, I have signed my name to this specification.

WILLIAM H. MOUNT.